United States Patent
Woller et al.

(12) 
(10) Patent No.: US 9,056,623 B1
(45) Date of Patent: Jun. 16, 2015

(54) GAME TRANSPORTING APPARATUS AND METHOD OF USE

(71) Applicant: Viking Solutions, LLC, Decatur, AL (US)

(72) Inventors: Ronald R. Woller, Decatur, AL (US); John A. Woller, Decatur, AL (US); John A. Woller, Jr., Decatur, AL (US)

(73) Assignee: VIKING SOLUTIONS, LLC, Decatur, AL (US)

( * ) Notice: Subject to any disclaimer, the term of this patent is extended or adjusted under 35 U.S.C. 154(b) by 0 days.

(21) Appl. No.: 14/563,249

(22) Filed: Dec. 8, 2014

Related U.S. Application Data

(60) Provisional application No. 61/913,615, filed on Dec. 9, 2013.

(51) Int. Cl.
| | |
|---|---|
| *B60R 9/06* | (2006.01) |
| *B62B 1/16* | (2006.01) |
| *B62B 1/12* | (2006.01) |
| *A01M 31/00* | (2006.01) |

(52) U.S. Cl.
CPC ... *B62B 1/16* (2013.01); *B62B 1/12* (2013.01); *A01M 31/006* (2013.01)

(58) Field of Classification Search
CPC ...... B60R 9/06; A01M 31/006; A01M 31/02; B60P 1/4407; B60P 2202/42
USPC .................................................. 280/30, 47.2
See application file for complete search history.

(56) References Cited

U.S. PATENT DOCUMENTS

| | | | | |
|---|---|---|---|---|
| 3,796,333 | A * | 3/1974 | Goldstein | 414/462 |
| 4,744,590 | A * | 5/1988 | Chesney | 280/769 |
| 4,934,894 | A * | 6/1990 | White | 414/462 |
| 5,018,651 | A * | 5/1991 | Hull et al. | 224/502 |
| 5,038,983 | A * | 8/1991 | Tomososki | 224/521 |
| 5,328,192 | A * | 7/1994 | Thompson | 280/47.24 |
| 5,368,209 | A * | 11/1994 | Hill | 224/497 |
| 5,492,196 | A * | 2/1996 | Michno | 182/20 |
| 5,586,702 | A * | 12/1996 | Sadler | 224/521 |
| 5,810,374 | A * | 9/1998 | Small | 280/47.24 |
| 5,887,676 | A * | 3/1999 | Harbin | 182/20 |
| 5,887,879 | A * | 3/1999 | Chumley | 280/40 |
| 5,911,556 | A | 6/1999 | Caldwell | |
| 6,139,247 | A * | 10/2000 | Wright | 414/462 |
| 6,202,909 | B1 * | 3/2001 | Belinky et al. | 224/524 |
| 6,217,043 | B1 * | 4/2001 | Chumley | 280/40 |

(Continued)

FOREIGN PATENT DOCUMENTS

CA 2515878 A1 9/2006

*Primary Examiner* — Brodie Follman
(74) *Attorney, Agent, or Firm* — Bush Intellectual Property Law; Kenneth M. Bush

(57) ABSTRACT

A game animal transporting apparatus having a support tube attachable to the rear hitch of a transport vehicle and a support frame attachable to the support tube to function as an exterior cargo carrier. The support frame is rotatable in either a clockwise or counter-clockwise direction for ease of loading objects onto the support frame. The support frame is lockable in a horizontal position for transport. The support frame is detachable from the support tube. A handle and wheel assembly are attachable to the support frame to form a mobile utility cart. The cart can be wheeled to a remote location to retrieve a game animal and then returned to the transport vehicle, after which, the support frame can be secured to the support tube, the handle and wheel assembly can be detached, and the game animal can be transported to another location.

7 Claims, 6 Drawing Sheets

(56) References Cited

U.S. PATENT DOCUMENTS

| | | | |
|---|---|---|---|
| 6,260,864 B1* | 7/2001 | Smith | 280/47.26 |
| 6,345,749 B1* | 2/2002 | Hamilton | 224/509 |
| 6,474,522 B1* | 11/2002 | Johnson | 224/515 |
| 6,609,481 B1 | 8/2003 | McCarty | |
| 6,638,001 B1 | 10/2003 | McKinley | |
| 6,685,421 B1* | 2/2004 | Reeves | 414/462 |
| 6,769,858 B1 | 8/2004 | Butler et al. | |
| 6,811,180 B1* | 11/2004 | Molliere | 280/652 |
| 6,869,265 B2 | 3/2005 | Smith et al. | |
| 6,921,007 B1* | 7/2005 | Guerrant | 224/519 |
| 7,293,951 B2 | 11/2007 | Meeks | |
| 8,840,161 B1 | 9/2014 | Gardner | |
| 8,985,418 B1* | 3/2015 | Poudrier | 224/521 |
| 2004/0051290 A1* | 3/2004 | Morgan | 280/769 |
| 2004/0080149 A1* | 4/2004 | Martin | 280/769 |
| 2004/0100045 A1* | 5/2004 | Amacker | 280/30 |
| 2006/0104767 A1 | 5/2006 | Dugger et al. | |
| 2006/0182571 A1 | 8/2006 | Hightower | |
| 2006/0207831 A1* | 9/2006 | Moore et al. | 182/20 |
| 2007/0169994 A1* | 7/2007 | Oftedahl | 182/116 |
| 2008/0111348 A1* | 5/2008 | Lawson | 280/511 |
| 2008/0206031 A1* | 8/2008 | Butta | 414/462 |
| 2008/0240897 A1* | 10/2008 | Miro et al. | 414/462 |
| 2009/0146394 A1* | 6/2009 | Seivert et al. | 280/504 |
| 2009/0180853 A1* | 7/2009 | Gang | 414/462 |
| 2009/0277856 A1* | 11/2009 | Lin | 211/195 |
| 2010/0066069 A1* | 3/2010 | Bradshaw | 280/769 |
| 2011/0210152 A1* | 9/2011 | Williams | 224/400 |
| 2015/0054236 A1* | 2/2015 | Rice | 280/30 |

* cited by examiner

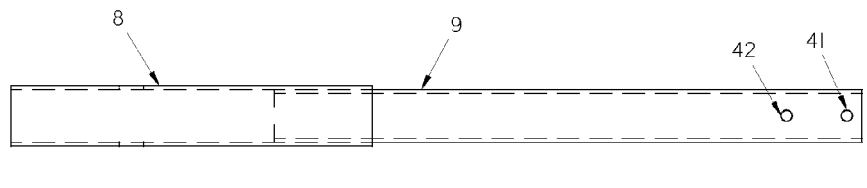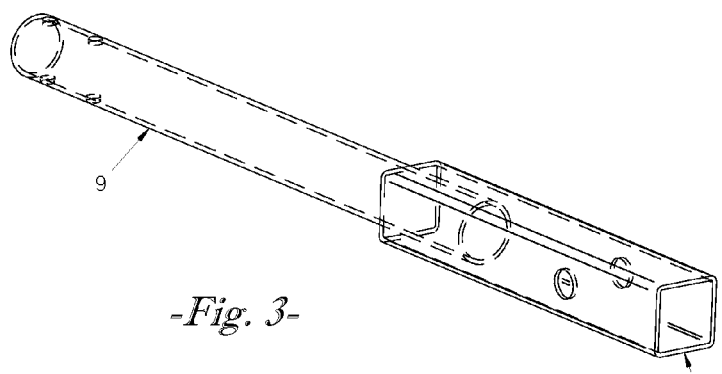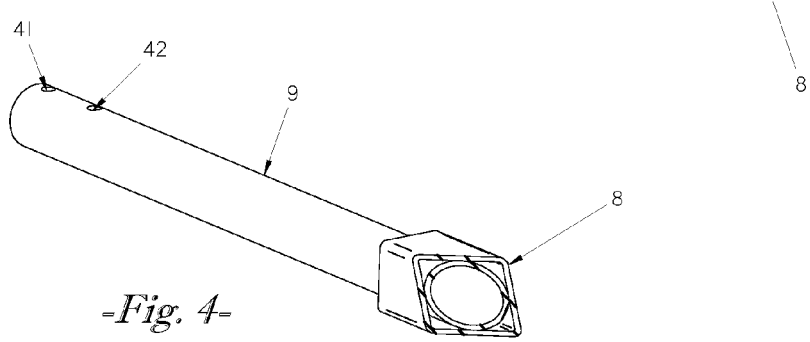

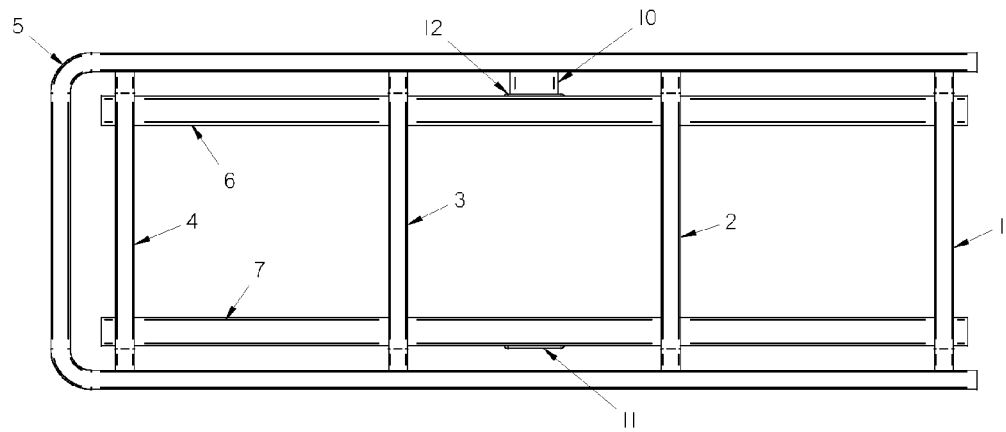
-Fig. 5-
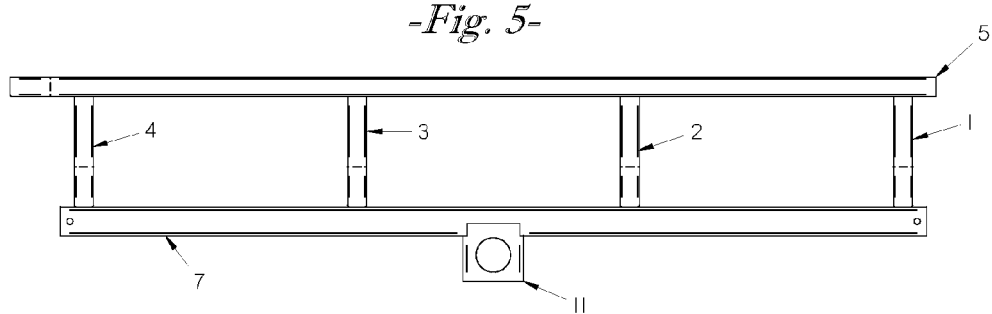
-Fig. 6-
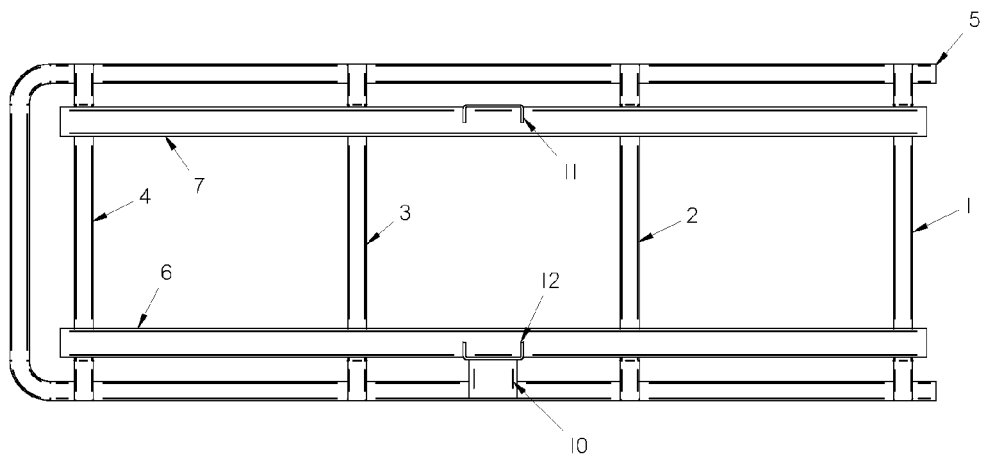
-Fig. 7-

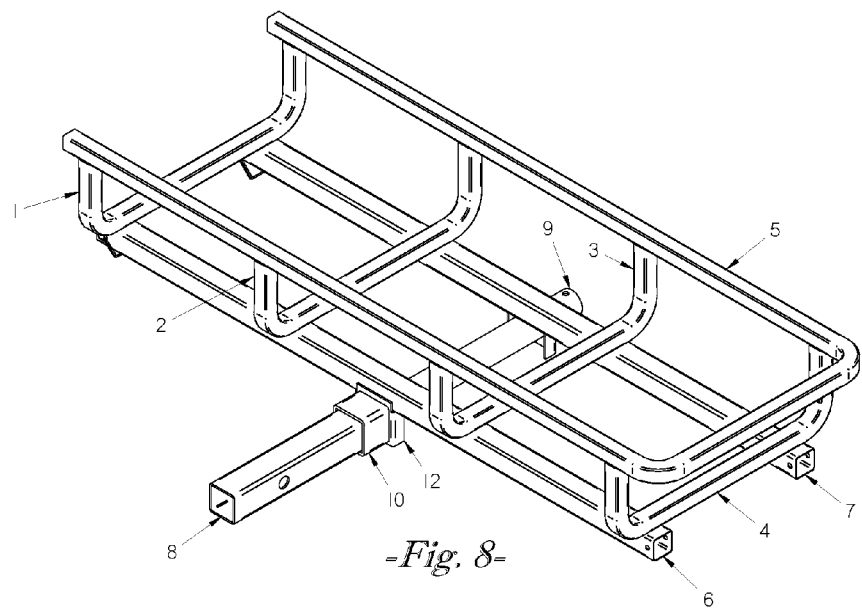
-Fig. 8-
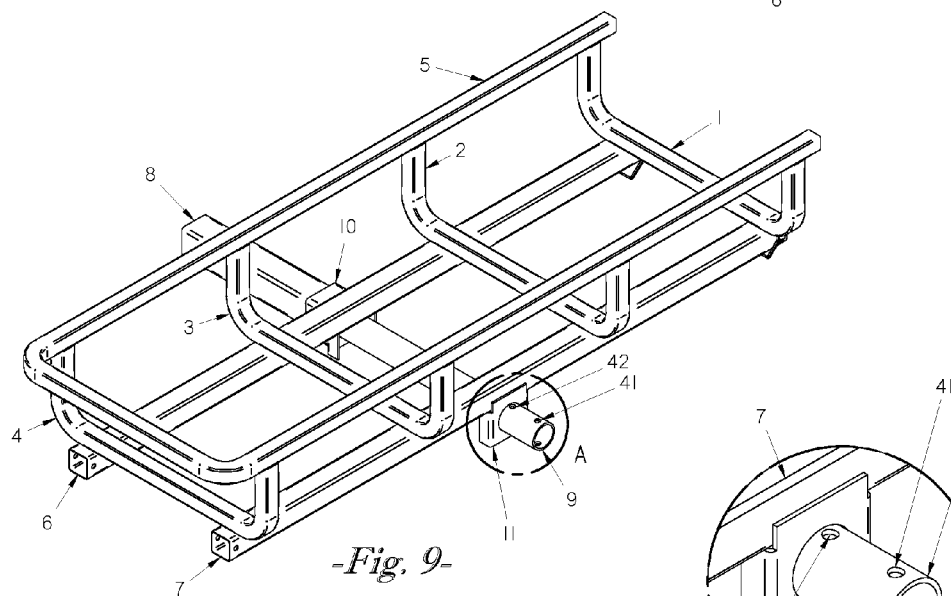
-Fig. 9-
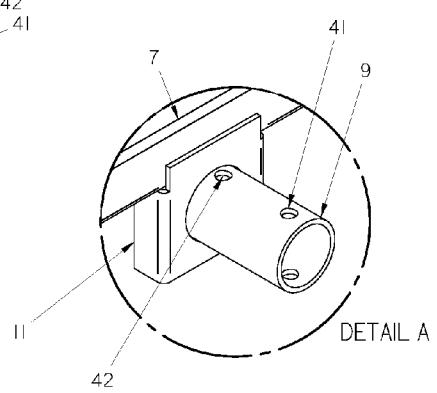
DETAIL A
-Fig. 10-

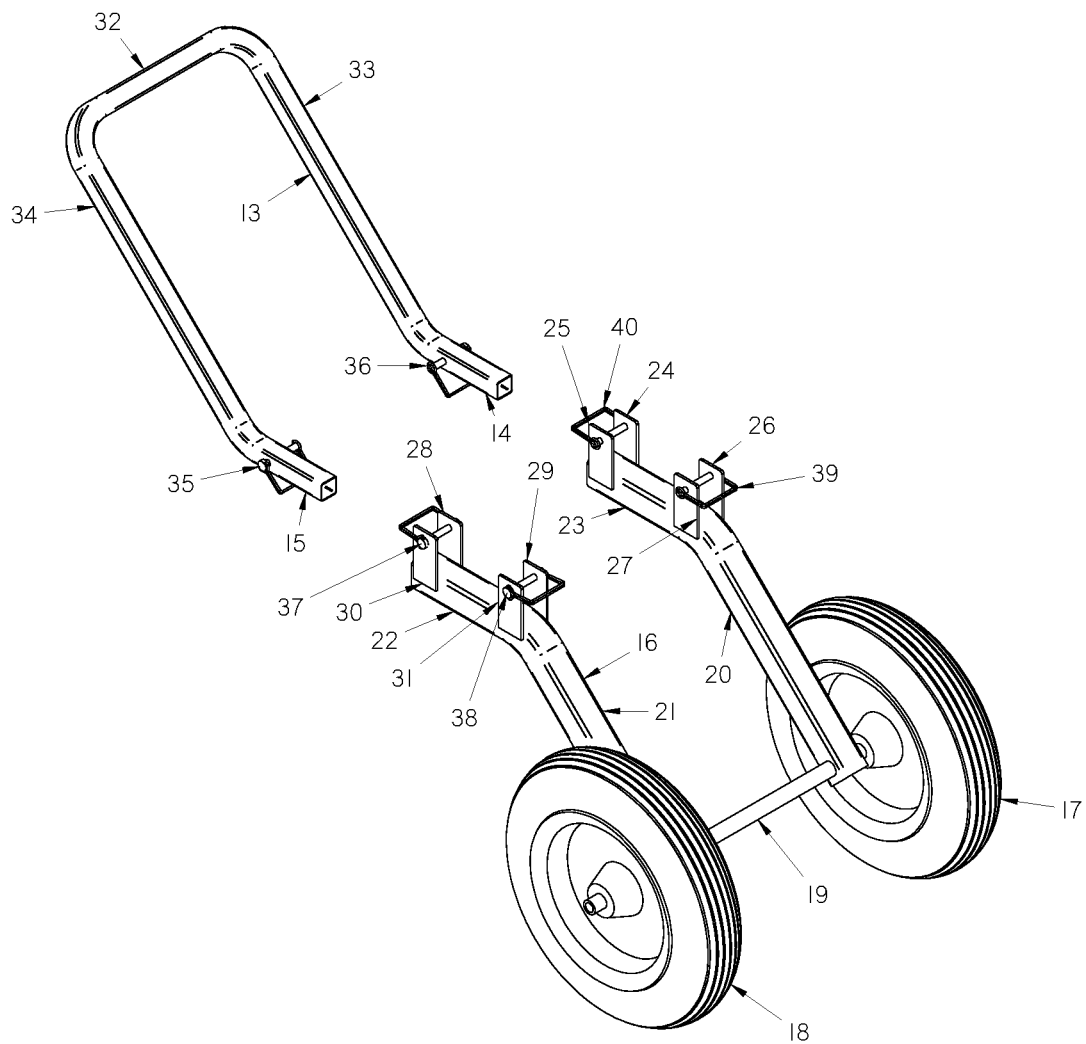
-Fig. 11-

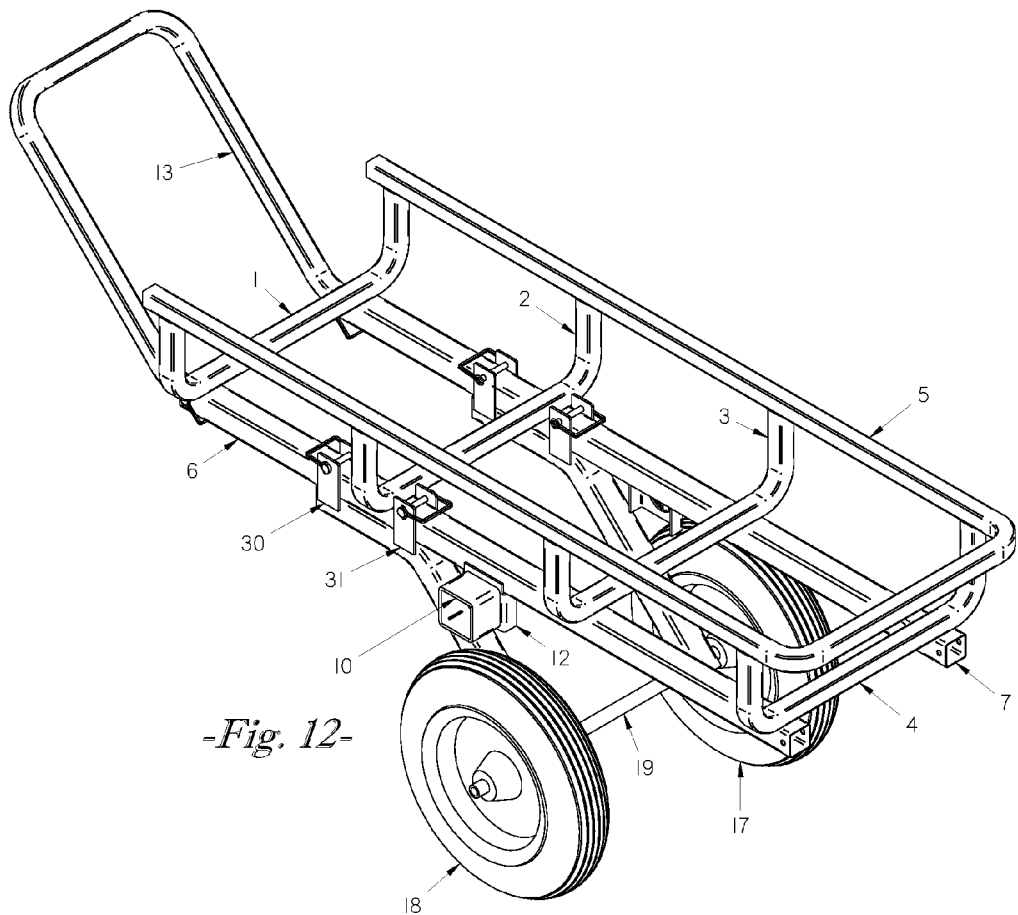
-Fig. 12-
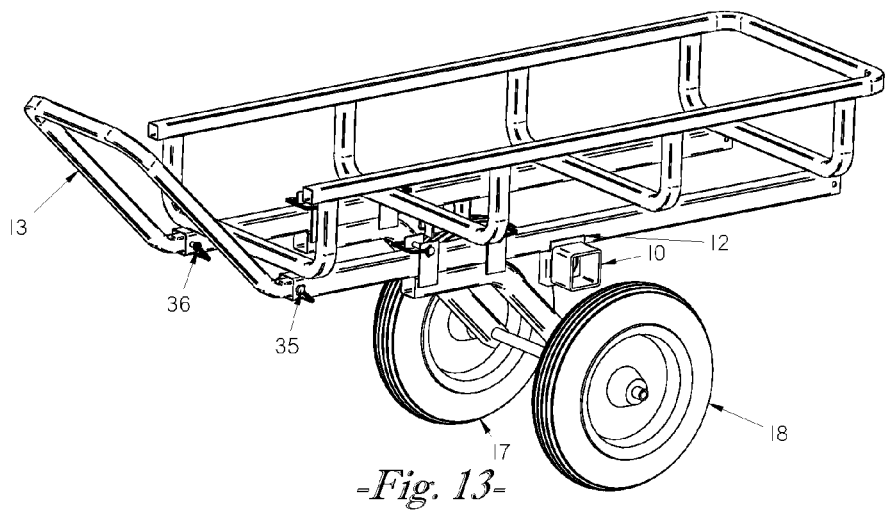
-Fig. 13-

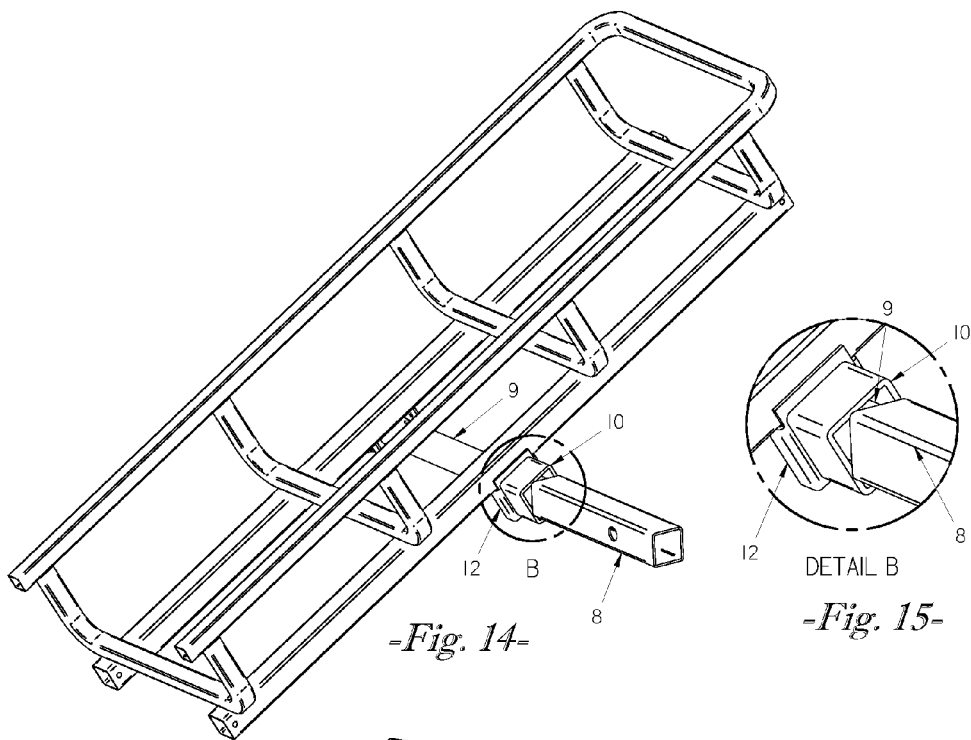
-Fig. 14-
-Fig. 15-
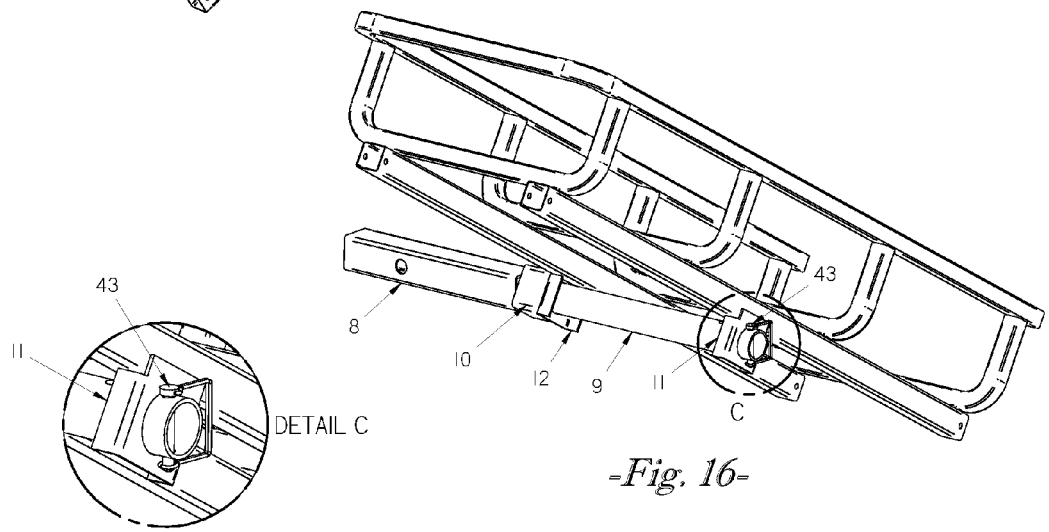
-Fig. 17-
-Fig. 16-

GAME TRANSPORTING APPARATUS AND METHOD OF USE

CROSS-REFERENCE TO RELATED APPLICATION

This application claims priority to U.S. Provisional Patent Application No. 61/913,615 filed Dec. 9, 2013, the disclosure of which is incorporated herein by reference.

FIELD OF THE INVENTION

The present invention is directed to game transporting devices and, more particularly, to a multi-purpose game transporting apparatus operable to assist a hunter with transporting a game animal to a transport vehicle and to assist a hunter with securing a game animal to a transport vehicle.

BACKGROUND OF THE INVENTION

It is common practice in the sport of hunting large game animals to retrieve and transport harvested game to transport vehicles, such as pickup trucks or sport utility vehicles, and then secure the animals to the vehicles for transport to a remote location for processing. Many species of large game animals can easily weigh more than 200 pounds and it can be very difficult for a single hunter to transport an animal to a transport vehicle or to elevate and load an animal onto a transport vehicle.

What is needed is a game transporting apparatus that can be conveniently used by a single person and that is operable to assist a hunter with transporting a game animal to a transport vehicle and to assist a hunter with securing a game animal to a transport vehicle.

SUMMARY OF THE INVENTION

The present invention comprises a game transporting apparatus and a method of using the apparatus to transport a game animal. The transporting apparatus preferably comprises 4 principal components that allow the apparatus to be used in 2 principal ways. The apparatus comprises a support tube assembly, a support frame assembly, a handle, and a wheel assembly. The support tube assembly is operable for attachment to the rear of a transport vehicle via a standard 2-inch receiver-style hitch commonly found on modern automobiles, pickup trucks, and sport utility vehicles (SUV's). The support frame assembly can be reversibly attached to the support tube assembly to function as an exterior vehicle cargo carrier. A principal feature of the support frame assembly is the ability to selectively rotate in either a clockwise or counter-clockwise direction from a fixed horizontal position for ease of loading heavy or bulky objects (e.g. game animals) onto the support frame assembly, after which, the support frame assembly can be rotated back into the horizontal position and secured therein for transport. This is accomplished with a transitional square-to-round support tube assembly that is attached to the receiver hitch of the vehicle. The support frame assembly is mounted and secured to the support tube assembly preferably with a linchpin. The support frame assembly has at least two brackets with circular holes to receive the round portion of the support tube assembly for axial and rotational movement. The bracket on the vehicle side of the support frame assembly includes a square socket to slidably engage the square portion of the support tube assembly, thus maintaining a fixed horizontal position of the support frame assembly during operation of the vehicle. The support frame assembly can be quickly detached from the support tube assembly by removing the linchpin from the support tube assembly. A handle and wheel assembly can be quickly and reversibly attached to the support frame assembly which allows the support frame assembly to be used as a mobile utility cart. The cart can be wheeled to a remote location to retrieve a game animal and then returned to the transport vehicle, after which, the support frame assembly can be quickly secured to the support tube assembly, the handle and wheel assembly can be detached, and the animal can be transported to a remote location for processing.

These and other features of the invention will become apparent from the following detailed description of the invention.

BRIEF DESCRIPTION OF THE DRAWINGS

FIG. 1 is a front elevation view of the support tube assembly.

FIG. 2 is a top plan view of the support tube assembly.

FIG. 3 is a front perspective view of the support tube assembly.

FIG. 4 is a front perspective view, partially in section, of the support tube assembly.

FIG. 5 is a top plan view of the support frame assembly.

FIG. 6 is a rear elevation view of the support frame assembly.

FIG. 7 is a bottom plan view of the support frame assembly.

FIG. 8 is a front perspective view of the support frame assembly shown mounted on the support tube assembly.

FIG. 9 is a rear perspective view of the support frame assembly shown mounted on the support tube assembly.

FIG. 10 is a rear perspective detail view of the support frame assembly shown mounted on the support tube assembly.

FIG. 11 is a perspective view of the handle and wheel assembly.

FIG. 12 is a front perspective view of the support frame assembly with the handle and wheel assembly attached.

FIG. 13 is another front perspective view of the support frame assembly with the handle and wheel assembly attached.

FIG. 14 is a front perspective view of the support frame assembly shown mounted on the support tube assembly and tilted from the horizontal position.

FIG. 15 is a front perspective detail view of the support frame assembly shown mounted on the support tube assembly and tilted from the horizontal position FIG. 16 is a rear perspective view of the support frame assembly shown mounted on the support tube assembly and tilted from the horizontal position.

FIG. 17 is a rear perspective detail view of the support frame assembly shown mounted on the support tube assembly and tilted from the horizontal position.

When the terms "top," "bottom," "right," "left," "front," "rear," "first," "second," "inside," "outside," "vertical," "horizontal," and similar terms are used herein, the terms should be understood in reference to the orientation of the implementations shown in the drawings and are utilized to facilitate description thereof.

DETAILED DESCRIPTION OF THE INVENTION

The present invention comprises a game transporting apparatus and a method of using the apparatus to transport a game animal. The game transporting apparatus, shown in FIGS. 1-17, preferably comprises a support tube assembly, a support frame assembly, a handle, and a wheel assembly. These sections are preferably made from hollow metal tubing.

The support tube assembly, best illustrated in FIGS. 1-4, preferably comprises a cross-sectionally square receiver engagement tube 8 coaxially affixed to a cross-sectionally round rotation tube 9. The receiver engagement tube 8 is operable to mount to a receiver hitch of a transport vehicle so that it is supported substantially horizontally therefrom. The support tube assembly is operable to support the support frame assembly thereon and provides the functional means to allow rotation of the support frame assembly about the centerline axis of the rotation tube 9. The rotation tube 9 comprises two linchpin holes 41, 42 for selectively receiving a linchpin 43 therethrough, thus allowing the selective engagement or disengagement of the support frame assembly with the support tube assembly, described in greater detail below.

The support frame assembly, illustrated in FIGS. 5-10 and 12-17, preferably comprises main support tubes 6, 7 that provide the base support structure for the assembly. Affixed to the main support tubes 6, 7 are a plurality of U-shaped frame tubes 1, 2, 3, 4. Affixed to the top ends of the frame tubes 1, 2, 3, 4 is a rail tube 5. Thus, the support frame assembly preferably forms an open-top basket structure. Affixed to the main support tubes 6, 7 are pivot brackets 11, 12, each having a round hole for receiving the rotation tube 9 therethrough. A rotation locking tube 10 is preferably affixed to pivot bracket 12. Rotation locking tube 10 is preferably cross-sectionally square and is sized appropriately to slidably engage the outside perimeter of the receiver engagement tube 8, thus providing a male/female square socket to lock the support frame assembly from rotating about rotation tube 9.

The handle 13, illustrated in FIGS. 11-13, preferably comprises handle segment 32, upper arm segments 33, 34, and lower arm segments 14, 15. The ends of lower arm segments 14, 15 are operable to slidably couple to the ends of the main support tubes 6, 7 of the support frame assembly. A plurality of linchpins 35, 36 is preferably used to reversibly secure the ends of lower arm segments 14, 15 to the main support tubes 6, 7 of the support frame assembly. The handle 13 may be telescoping to adjust the distance between the handle segment 32 and the support frame assembly.

The wheel assembly 16, illustrated in FIGS. 11-13, preferably comprises upper leg segments 22, 23, lower leg segments 20, 21, and an axle 19 coupled to the lower ends of lower leg segments 20, 21 and having wheels 17, 18 rotatably mounted to opposing ends thereof. A plurality of attachment tabs 24, 25, 26, 27, 28, 29, 30, 31 is affixed to upper leg segments 22, 23 to facilitate attachment of the wheel assembly 16 to the support frame assembly. A plurality of linchpins 37, 38, 39, 40 is preferably used to reversibly secure attachment tabs 24, 25, 26, 27, 28, 29, 30, 31 of wheel assembly 16 to the support frame assembly.

In operation, the receiver engagement tube 8 of the support tube assembly is coupled to the receiver hitch of a transport vehicle. As shown in FIGS. 8-10, the support frame assembly is connected to the support tube assembly. The support frame assembly is positioned such that the pivot brackets 11, 12 engage the rotation tube 9 as shown. The rotation locking tube 10 is fully engaged with the rear end of the receiver engagement tube 8, thereby preventing rotation of the support frame assembly about the rotation tube 9. To lock the support frame assembly in the horizontal position and prevent axial or rotational movement of the support frame assembly relative to the rotation tube 9, a linchpin 43 is secured within linchpin hole 42 to prevent disengagement of the rotation locking tube 10 from the receiver engagement tube 8.

If an animal needing to be loaded is in immediate proximity to the transport vehicle, the support frame assembly can be tilted to facilitate loading the animal onto the support frame assembly. As best shown in FIGS. 14-17, the linchpin 43 can be removed from the front hole 42 in the rotation tube 9 and repositioned within the rear hole 41. The support frame assembly may be slid axially rearward away from the vehicle along the rotation tube 9 to disengage the rotation locking tube 10 from the receiver engagement tube 8. After disengagement, the support frame assembly may be rotated either clockwise or counter-clockwise approximately 30-40 degrees to engage the ground and provide a "ramp" access to the support frame assembly. This facilitates loading objects onto the support frame assembly. After the animal has been loaded onto the support frame assembly, the support frame assembly can be rotated back into the horizontal position and slid axially forward along the rotation tube 9 toward the vehicle to engage the rotation locking tube 10 with the receiver engagement tube 8, and then the linchpin 43 can be removed from the rear hole 41 and repositioned within the front hole 42, thereby securing the support frame assembly in the horizontal position for transport.

If an animal needing to be loaded is not in immediate proximity to the transport vehicle, the support frame assembly can be removed from the support tube assembly and transformed into a portable utility cart to retrieve the animal. As best shown in FIGS. 12 and 13, the linchpin 43 can be removed from the linchpin hole 41 or 42 in the rotation tube 9 and the support frame assembly can be removed from the support tube assembly. The handle 13 and wheel assembly 16 can be secured to the support frame assembly, either before or after the support frame assembly is removed from the support tube assembly. To attach the handle 13, linchpins 35, 36 are removed from the handle lower arm segments 14, 15, the handle lower arm segments 14, 15 are inserted into the ends of the main support tubes 6, 7, and the linchpins 35, 36 are inserted through linchpin holes in the handle lower arm segments 14, 15 and the main support tubes 6, 7 to secure the handle 13 to the support frame assembly. To attach the wheel assembly 16, linchpins 37, 38, 39, 40 are removed from the wheel assembly attachment tabs 24, 25, 26, 27, 28, 29, 30, 31, the wheel assembly is juxtaposed against the support frame assembly such that the wheel assembly attachment tabs 24, 25, 26, 27, 28, 29, 30, 31 straddle the main support tubes 6, 7, and then the linchpins 37, 38, 39, 40 are inserted through linchpin holes in the attachment tabs 24, 25, 26, 27, 28, 29, 30, 31 and the main support tubes 6, 7 to secure the wheel assembly 16 to the support frame assembly. The wheel assembly 16 is preferably coupled to the support frame assembly so that the wheel axle 19 is slightly distal to the centerline of the support frame assembly relative to the handle 13 location to facilitate ergonomic positioning of the cart during use.

The cart can be wheeled to a remote location to retrieve a game animal and then returned to the transport vehicle, after which, the support frame assembly can be quickly secured to the support tube assembly by sliding the support frame assembly onto the rotation tube 9 such that the rotation tube 9 is received through the holes in the pivot brackets 11, 12 and locking tube 10, sliding the support frame assembly axially forward along the rotation tube 9 toward the vehicle to engage the rotation locking tube 10 with the receiver engagement tube 8, and then inserting the linchpin 43 into the front hole 42 to secure the support frame assembly in the horizontal position for transport. The handle 13 can be optionally detached, the wheel assembly 16 is preferably detached, and the animal can be transported to a remote location for processing.

The transporting apparatus of the present invention allows a single person to easily and conveniently load and secure a heavy animal to a transport vehicle. The transporting apparatus can be quickly modified and used for multiple purposes by a single person without the use of tools.

While the invention has been shown and described in some detail with reference to specific exemplary embodiments, there is no intention that the invention be limited to such detail. On the contrary, the invention is intended to include any alternative or equivalent embodiments that fall within the spirit and scope of the invention as described and claimed herein.

The invention claimed is:

1. A game animal transporting apparatus, comprising:
   a) a support tube assembly comprising a horizontally disposed cross-sectionally square receiver engagement tube and a cross-sectionally round rotation tube coaxially affixed to said receiver engagement tube, wherein said rotation tube has a hole therein for receiving a linchpin reversibly therethrough, wherein said receiver engagement tube is operable to mount to a receiver hitch of a transport vehicle;
   b) a support frame assembly comprising a first bracket mounted to an underside of said support frame assembly, a second bracket mounted to said underside of said support frame assembly, and a cross-sectionally square rotation locking tube mounted to said underside of said support frame assembly, wherein said first bracket and said second bracket each have a round hole therethrough for receiving said rotation tube reversibly therethrough;
   c) a handle reversibly attachable to said support frame assembly; and
   d) a wheel assembly reversibly attachable to said underside of said support frame assembly;
   e) wherein said first bracket and said second bracket are operable to slidably receive said rotation tube therethrough such that said support frame assembly is supported on said support tube assembly, wherein said support frame assembly is operable to pivot on said rotation tube, wherein said locking tube is operable to slidably engage an outside perimeter of said receiver engagement tube and thereby prevent said support frame assembly from pivoting on said rotation tube, wherein said linchpin is operable to reversibly engage said hole in said rotation tube and thereby maintain said locking tube in locking engagement with said receiver engagement tube.

2. A game animal transporting apparatus, comprising:
   a) a support tube having a cross-sectionally square end and a cross-sectionally round end, wherein said round end has a hole therein for receiving a locking pin reversibly therethrough, wherein said square end is operable to mount to a receiver hitch of a transport vehicle; and
   b) a support frame having a first bracket mounted to an underside of said support frame, a second bracket mounted to said underside of said support frame, and a cross-sectionally square tube mounted to said underside of said support frame, wherein said first bracket and said second bracket each have a round hole therethrough for receiving said round end of said support tube reversibly therethrough;
   c) wherein said first bracket and said second bracket are operable to slidably receive said round end of said support tube therethrough such that said support frame is supported on said support tube, wherein said support frame is operable to pivot on said round end of said support tube, wherein said square tube is operable to slidably engage an outside perimeter of said square end of said support tube and thereby prevent said support frame from pivoting on said round end of said support tube, wherein said locking pin is operable to reversibly engage said hole in said round end of said support tube and thereby maintain said square tube in locking engagement with said square end of said support tube.

3. An apparatus according to claim 2, further comprising a handle reversibly attachable to said support frame.

4. An apparatus according to claim 2, further comprising a wheel assembly reversibly attachable to said underside of said support frame.

5. A method of loading a game animal onto a transport vehicle, comprising the steps of:
   1) attaching a support tube to a receiver hitch of said transport vehicle, said support tube having a cross-sectionally square end and a cross-sectionally round end, wherein said round end has a hole therein for receiving a locking pin reversibly therethrough, wherein said square end is operable to mount to said receiver hitch of said transport vehicle;
   2) securing the game animal onto a game transporting apparatus, said apparatus comprising:
      a) a support frame having a first bracket mounted to an underside of said support frame, a second bracket mounted to said underside of said support frame, and a cross-sectionally square tube mounted to said underside of said support frame, wherein said first bracket and said second bracket each have a round hole therethrough for receiving said round end of said support tube reversibly therethrough;
      b) a handle attached to said support frame; and
      c) a wheel assembly attached to said underside of said support frame;
   3) placing said game transporting apparatus adjacent to said support tube;
   4) sliding said support frame onto said support tube such that said first bracket and said second bracket slide onto said round end of said support tube and said square tube slidably engages an outside perimeter of said square end of said support tube to prevent said support frame from pivoting on said support tube; and
   5) inserting said locking pin into said hole in said round end of said support tube to maintain said square tube in locking engagement with said square end of said support tube.

6. A method according to claim 5, further comprising the step of detaching said handle from said support frame after said inserting step.

7. A method according to claim 5, further comprising the step of detaching said wheel assembly from said support frame after said inserting step.

* * * * *